United States Patent
Matula et al.

(10) Patent No.: US 10,204,503 B1
(45) Date of Patent: Feb. 12, 2019

(54) SYSTEM AND METHOD OF UTILIZING DIAGNOSTIC CIRCUITRY

(71) Applicant: Dell Products L.P., Round Rock, TX (US)

(72) Inventors: Terry Lane Matula, Austin, TX (US); Craig Lawrence Chaiken, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 15/950,685

(22) Filed: Apr. 11, 2018

(51) Int. Cl.
*G08B 21/18* (2006.01)
*G06F 1/28* (2006.01)
*G06F 1/26* (2006.01)

(52) U.S. Cl.
CPC ............. *G08B 21/18* (2013.01); *G06F 1/263* (2013.01); *G06F 1/28* (2013.01)

(58) Field of Classification Search
CPC ...... G06F 11/27; G06F 11/079; G06F 11/263; G06F 11/0709; G06F 1/263; G06F 1/28; G08B 21/18
USPC ...... 340/636.1; 702/117–118; 714/25–31, 46
See application file for complete search history.

(56) References Cited

U.S. PATENT DOCUMENTS

| | | | | |
|---|---|---|---|---|
| 4,849,734 A | * | 7/1989 | Williamson | G08B 29/04 340/506 |
| 2013/0218493 A1 | * | 8/2013 | Weddle | G05B 19/058 702/60 |
| 2016/0159278 A1 | * | 6/2016 | Baker | G09B 9/00 340/471 |

* cited by examiner

*Primary Examiner* — Joseph Feild
*Assistant Examiner* — Sharmin Akhter
(74) *Attorney, Agent, or Firm* — Baker Botts L.L.P.

(57) ABSTRACT

In one or more embodiments, one or more systems, methods, and/or processes may determine, via a first switch, that a signal from an embedded controller has not been received; may determine if a second switch is actuated by a user; if the second switch is actuated, may display first information that indicates that power from the at least one of an external power source and a battery power source is received; may determine, via a third switch, if the at least one of the external power source and the battery power source includes the external power source; and if the at least one of the external power source and the battery power source includes the external power source, may display second information that indicates the at least one of the external power source and the battery power source includes the external power source.

20 Claims, 7 Drawing Sheets

SYSTEM AND METHOD OF UTILIZING DIAGNOSTIC CIRCUITRY

BACKGROUND

Field of the Disclosure

This disclosure relates generally to information handling systems and more particularly to displaying information based at least on one or more statuses of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive power from at least one of an external power source and a battery power source; may determine, via a first switch, that a signal from an embedded controller has not been received; may determine if a second switch is actuated by a user; if the second switch is actuated, may display first information that indicates that power from the at least one of the external power source and the battery power source is received; may determine, via a third switch, if the at least one of the external power source and the battery power source includes the external power source; and if the at least one of the external power source and the battery power source includes the external power source, may display second information that indicates the at least one of the external power source and the battery power source includes the external power source. In one example, the first switch may include a first transistor. In another example, the third switch may include a second transistor, different from the first transistor.

In one or more embodiments, displaying the first information may include illuminating a first light emitting diode that emits light of a first color. In one or more embodiments, displaying the second information may include illuminating a second light emitting diode that emits light of a second color, different from the first color. In one or more embodiments, a multi-color light emitting diode may include at least one of the first light emitting diode and the second light emitting diode. In one or more embodiments, the embedded controller may be configured to cease the first information from being displayed. For example, the embedded controller may be further configured to actuate a fourth switch. For instance, a signal may be received via the fourth switch, and the first information may be ceased from being displayed. In one or more embodiments, the one or more systems, methods, and/or processes may determine, via a fourth switch, if the at least one of the external power source and the battery power source includes the battery power source. If the at least one of the external power source and the battery power source includes the battery power source, third information may be displayed, where the third information may indicate that the at least one of the external power source and the battery power source includes the battery power source.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
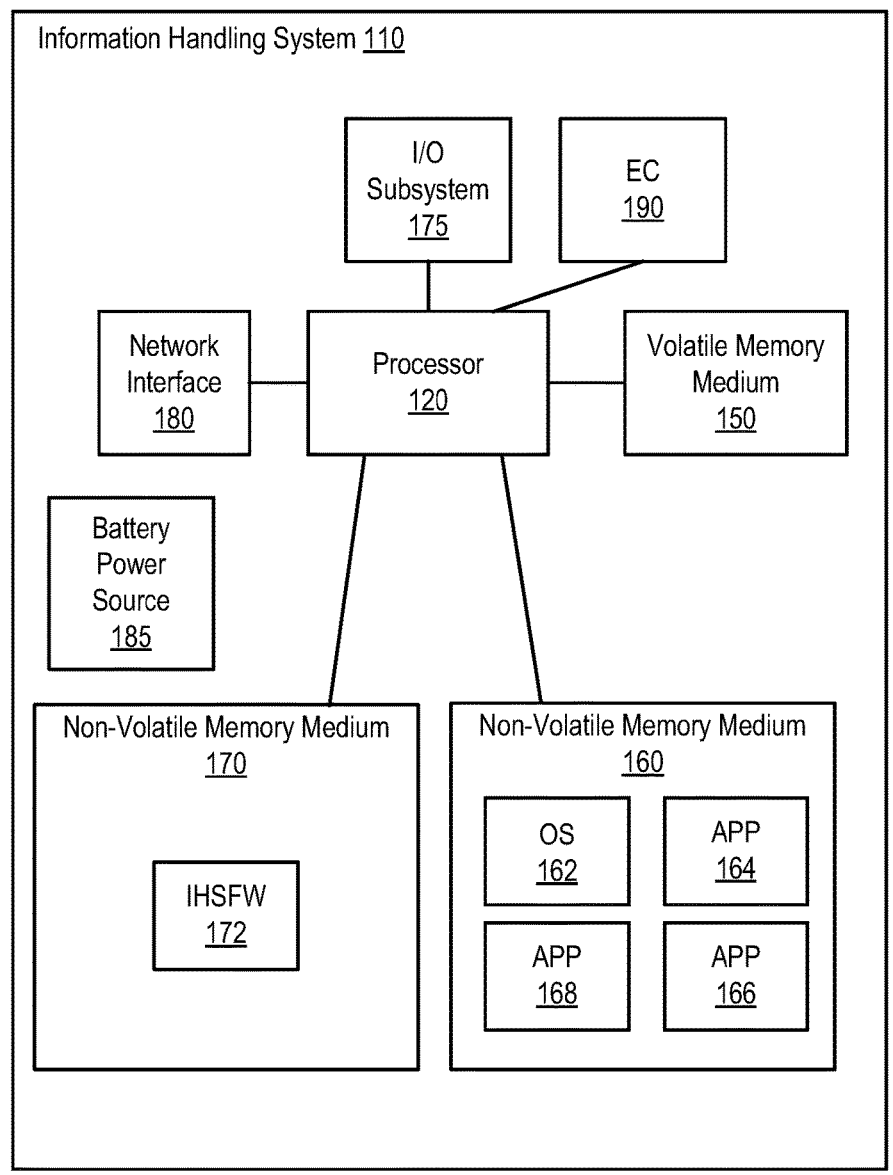
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more components of an information handling system may have or develop one or more issues. For example, one or more voltage regulators, of an information handling system, may have or develop one or more issues. In one or more embodiments, one or more issues associated with an information handling system may be indicated by the information handling system. For example, an information handling system may have diagnostic circuitry that may determine one or more issues associated with an information handling system. For instance, the diagnostic circuitry may indicate information, associated with the one or more issues, to a user. In one or more embodiments, an information handling system may indicate information to a user via one or more of a display, a screen, a panel, and a light emitting diode (LED), among others. For example, an information handling system may indicate information associated with one or more issues and/or one or more statuses via one or more light emitting diodes (LEDs) based at least on a query from the user. For instance, the diagnostic circuitry may indicate information associated with one or more issues and/or one or more statuses via one or more LEDs based at least on a query from the user.

In one or more embodiments, the diagnostic circuitry may be utilized in eliminating dispatches for an issue that could be addressed by a user. For example, eliminating dispatches for an issue that could be addressed by a user may reduce energy associated with shipping new and/or replacement components and/or associated with dispatching technical assistance personnel. For instance, reducing energy may reduce and/or mitigate one or more environmental issues (e.g., emissions, waste products, etc.) associated with producing energy.

Turning now to FIG. 1A, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and an embedded controller (EC) 190. As illustrated, volatile memory medium 150, non-volatile memory media 160 and 170, I/O subsystem 175, network interface 180, and EC 190 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, EC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

In one or more embodiments, processor 120 and one or more components of IHS 110 may be included in a system-on-chip (SoC). For example, the SoC may include processor 120 and a platform controller hub (not specifically illustrated). In one or more embodiments, IHS 110 may include a battery power source 185. For example, battery power source 185 may provide power from one or more batteries. In one instance, battery power source 185 may provide power to one or more components of IHS 110. In another instance, battery power source 185 may provide power to one or more peripherals coupled to IHS 110.

Figure 2:
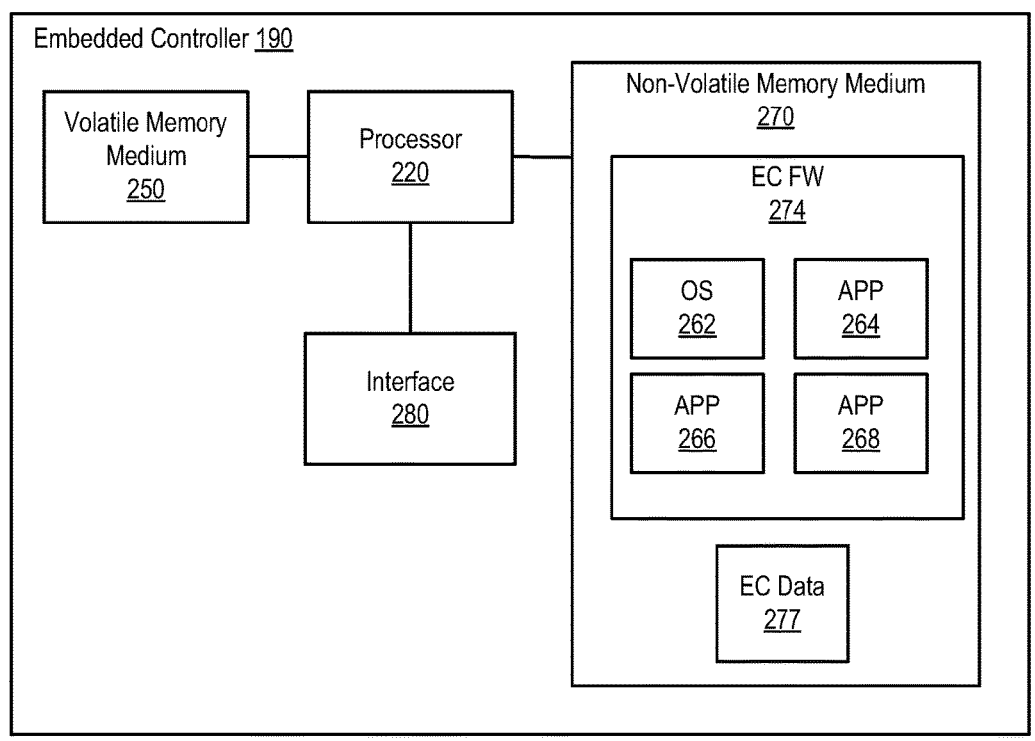
FIG. 2 illustrates an example of an embedded controller, according to one or more embodiments.

Turning now to FIG. 2, an example embedded controller is illustrated, according to one or more embodiments. As shown, EC 190 may include a processor 220, a volatile memory medium 250, a non-volatile memory medium 270, and an interface 280. As illustrated, non-volatile memory medium 274 may include an EC FW 274, which may include an OS 262 and APPs 264-268, and may include EC data 277. For example, OS 262 may be or include a real-time operating system (RTOS).

In one or more embodiments, interface 280 may include circuitry that enables communicatively coupling to one or more devices. In one example, interface 280 may include circuitry that enables communicatively coupling to one or more buses. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 190 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Figure 3:
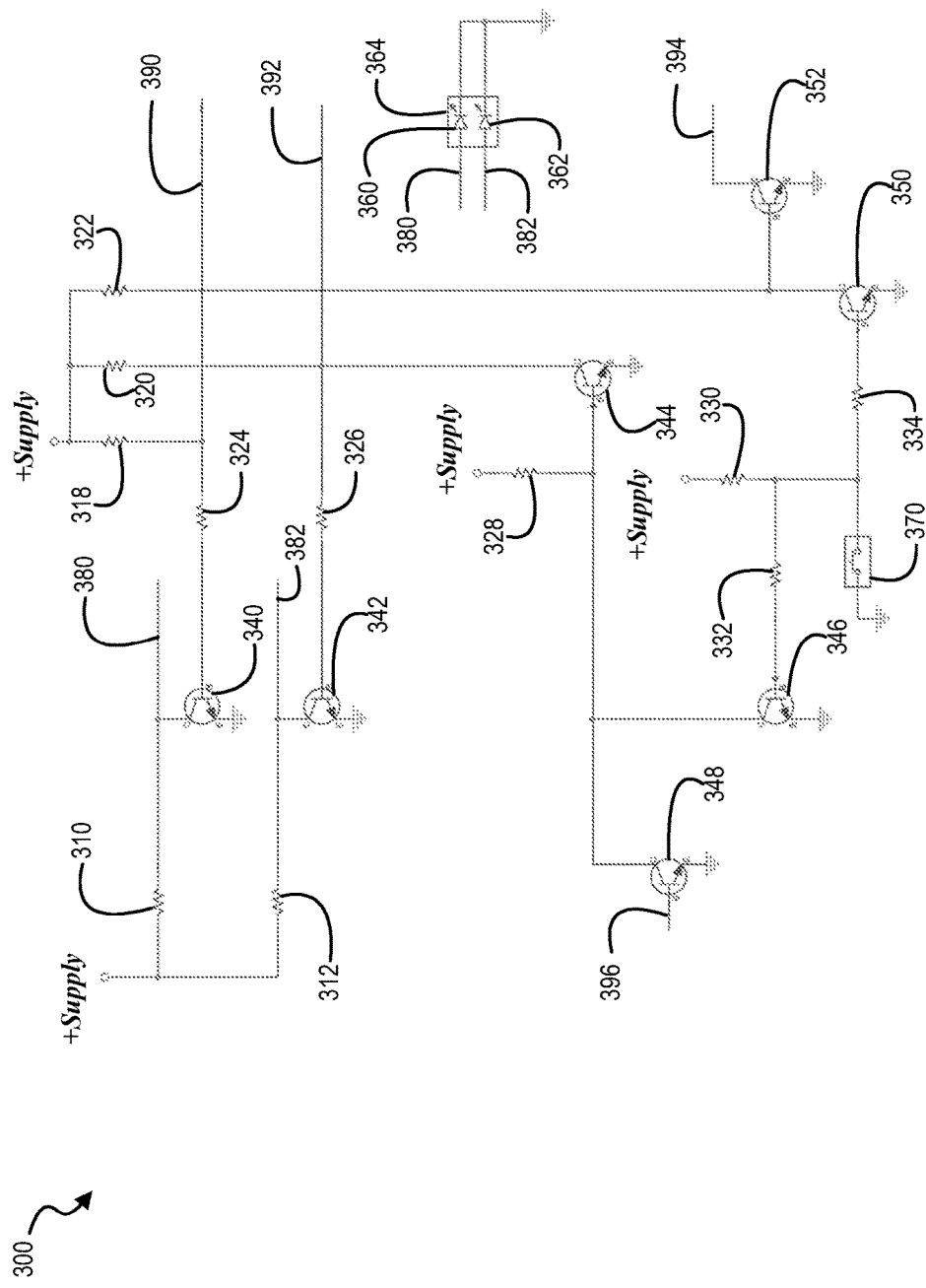
FIG. 3 illustrates an example of circuitry, according to one or more embodiments.

Turning now to FIG. 3, an example of circuitry is illustrated, according to one or more embodiments. In one or more embodiments, circuitry 300 may include multiple switches. In one example, a switch may be or include a transistor. For instance, a transistor may include a bipolar junction transistor (BJT), a junction gate field-effect transistor (JFET), or a metal-oxide-semiconductor field-effect transistor (MOSFET), among others. In a second example, a switch may be or include a logic gate. In another example, a switch may be or include a mechanical switch. In one instance, the mechanical switch may be normally open. In another instance, the mechanical switch may be normally closed.

Figure 1B:
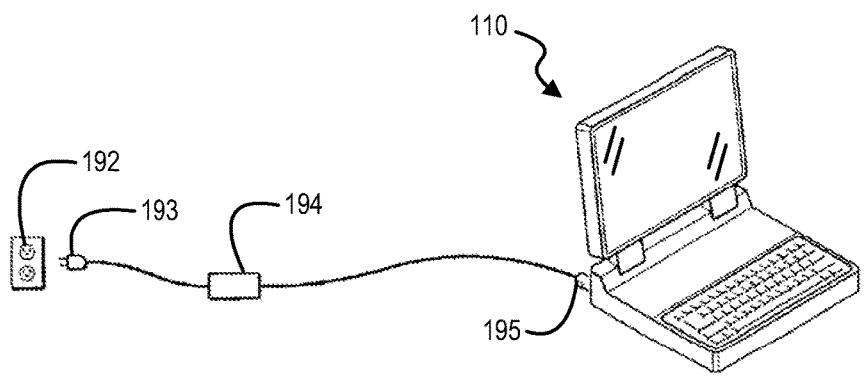
FIG. 1B illustrates an example of an information handling system coupled to an external power supply, according to one or more embodiments.

As illustrated, circuitry 300 may be coupled to a power supply "+Supply". In one or more embodiments, the power supply may include power from one or more of a battery power source (e.g., battery power source 185) and an external power source (e.g., an external power supply 194, illustrated in FIG. 1B).

Figure 1C:
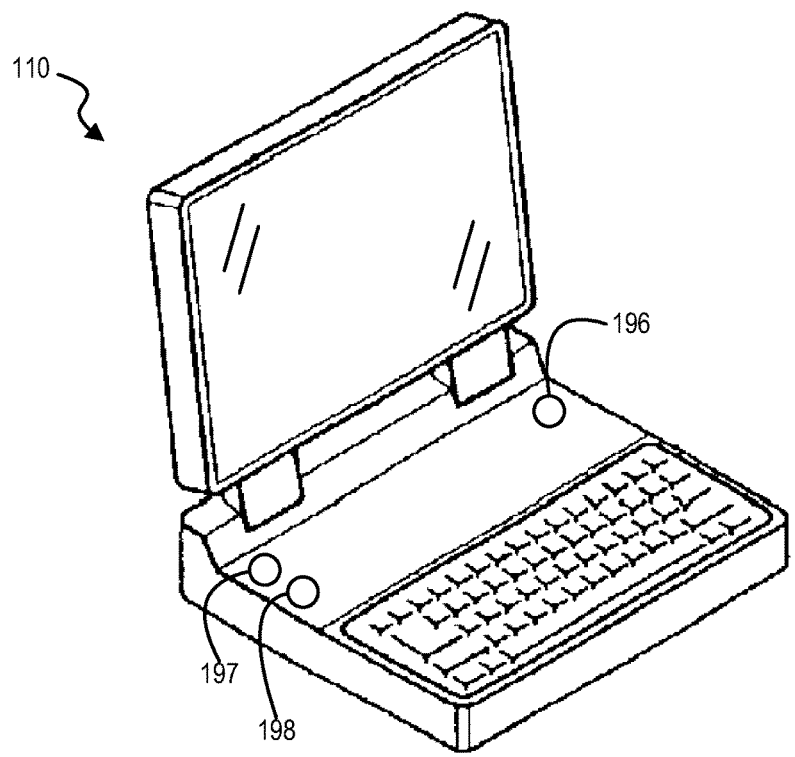
FIG. 1C illustrates an example of an information handling system with at least one information indicator, according to one or more embodiments.

As shown, transistors 340 and 342 may be coupled to the power supply via resistors 310 and 312, respectively. As illustrated, transistors 340 and 342 may be coupled to leads 380 and 382, respectively. As shown, leads 380 and 382 may be coupled to LEDs 360 and 362, respectively. For example, transistors 340 and 342 may respectively switch LEDs 360 and 362 on and off. In one instance, LED 360 may provide light emissions associated with a first color. In another instance, LED 362 may provide light emissions associated with a second color, different from the first color. In one or more embodiments, a bi-color LED 364 may include LEDs 360 and 362. In one example, LED 360 may provide light emissions associated with a white color. For instance, the white color may appear white to a user of IHS 110. In another example, LED 362 may provide light emissions associated with an amber color. For instance, the amber color may appear amber to a user of IHS 110. In one or more embodiments, one or more of LEDs 360 and 362 may be coupled to or included in indicator 197, illustrated in FIG. 1C. For example, indicator 197 may be or include bi-color LED 364.

As illustrated, transistor 340 may be coupled to a lead 390 via a resistor 324. As shown, the power supply may be coupled to a lead 390 via a resistor 318. In one or more embodiments, lead 390 may be coupled to EC 190. For example, EC 190 may provide a signal to circuit 300 via lead 390. For instance, the EC 190 may assert lead 390 high or low. As illustrated, transistor 342 may be coupled to a lead 392 via resistor 326. As shown, the power supply may be coupled to a lead 392 via a resistor 320. In one or more embodiments, lead 392 may be coupled to EC 190. For example, EC 190 may provide a signal to circuit 300 via lead 392. For instance, the EC 190 may assert lead 392 high or low. As illustrated, a transistor 344 may be coupled to the power supply via resistors 320 and 328.

As shown, a transistor 348 may be coupled to transistor 344. In one or more embodiments, transistor 348 may be coupled to EC 190 via a lead 396. For example, EC 190 may provide a signal (e.g., a cessation signal) to circuit 300 via lead 396. For instance, EC 190 may assert lead 396 high or low. In one or more embodiments, EC 190 may inhibit and/or override one or more indications of circuitry 300. For example, if EC 190 asserts lead 396 high, then LED 362 may not be illuminated. For instance, circuitry 300 may illuminate LED 362, and if and/or when EC 190 asserts lead 396 high, circuitry 300 may no longer illuminate LED 362.

As illustrated, a transistor 346 may be coupled to the power supply via resistors 330 and 332. As shown, transistor 346 may be coupled to the power supply via resistor 328. As illustrated, transistor 346 may be coupled to transistor 348. As shown, transistor 346 may be coupled to a switch 370. In one or more embodiments, switch 370 may be or include a mechanical switch. For example, a user may actuate switch 370. For instance, the user may push a portion of switch 370 to actuate switch 370. In one or more embodiments, switch 370 may be coupled to a button 196, illustrated in FIG. 1C. In one or more embodiments, switch 370 may be or include button 196. As illustrated, switch 370 may be coupled to the power supply via resistor 330. As shown, switch 370 may be coupled to a transistor 350 via a resistor 334.

As illustrated, transistor 350 may be coupled to a transistor 352. As shown, transistor 350 may be coupled to the power supply via a resistor 322. As illustrated, transistor 352 may be coupled to the power supply via a resistor 322. As shown, transistor 352 may be coupled to a lead 394. In one or more embodiments, circuitry 300 may provide one or more signals to one or more components of IHS 110 via lead 394. For instance, circuitry 300 may provide one or more signals to a platform controller hub of IHS 110 via lead 394. For instance, circuitry 300 may assert lead 394 high or low. In one or more embodiments, EC 190 may be coupled to circuitry 300 via interface 280. For example, one or more of leads 390-396 may be coupled to interface 280 of EC 190.

Figure 4:
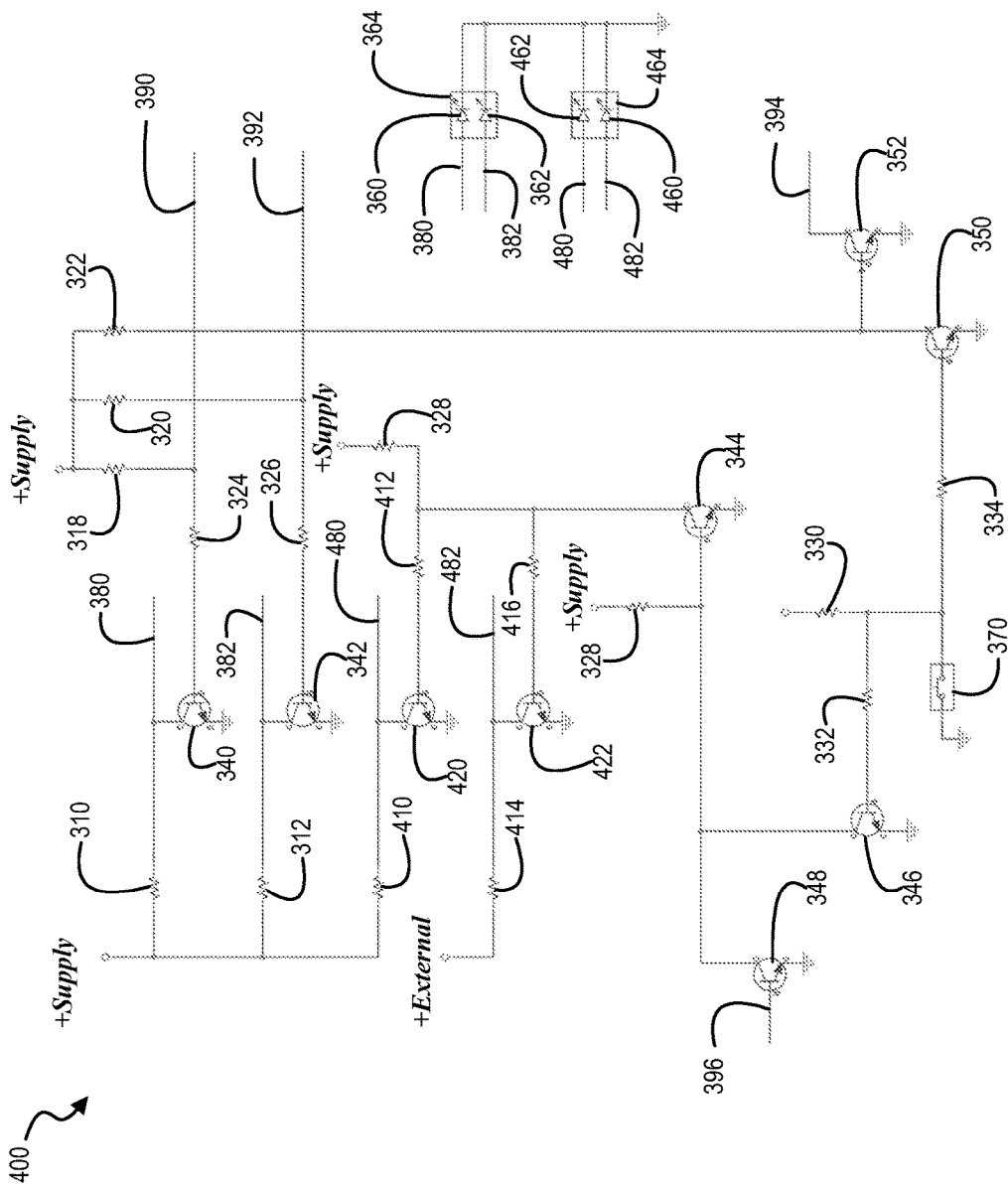
FIG. 4 illustrates another example of circuitry, according to one or more embodiments.

Turning now to FIG. 4, another example of circuitry is illustrated, according to one or more embodiments. In one or more embodiments, circuitry 400 may include multiple switches. In one example, a switch may be or include a transistor. For instance, a transistor may include a BJT, a JFET, or a MOSFET, among others. In a second example, a switch may be or include a logic gate. In another example, a switch may be or include a mechanical switch. In one instance, the mechanical switch may be normally open. In another instance, the mechanical switch may be normally closed. As illustrated, circuit 400 may include one or more portions of circuit 300, according to one or more embodiments.

As illustrated, circuitry 400 may be coupled to a power supply "+Supply". In one or more embodiments, the power supply may include power from one or more of a battery power source (e.g., battery power source 185) and an external power source (e.g., external power supply 194). As shown, circuitry 400 may be coupled to an external power supply "+External". In one or more embodiments, the external power supply may include power from an external power source. For example, the external power source may include an external power supply that receive alternating current and supplies direct current to IHS 110 and circuitry 400. In one instance, the external power source may be or include an external power supply 194, illustrated in FIG. 1B. In a second instance, external power supply 194 may receive alternating current via a plug 193 from alternating current power supply plug 192. In another instance, external power supply 194 may provide direct current to IHS 110 via a plug 195.

As shown, a transistor 420 may be coupled to the power supply via a resistor 410. As illustrated, transistor 420 may be coupled to the power supply via resistors 412 and 328. As shown, transistor 420 may be coupled to a lead 480. As illustrated, a transistor 422 may be coupled to the external power supply via a resistor 414. As shown, transistor 422 may be coupled to the power supply via resistors 416 and 328. As illustrated, transistor 422 may be coupled to a lead 482.

As shown, leads 480 and 482 may be coupled to LEDs 460 and 462, respectively. For example, transistors 420 and 422 may respectively switch LEDs 460 and 462 on and off. In one instance, LED 460 may provide light emissions associated with a first color. In another instance, LED 462 may provide light emissions associated with a second color, different from the first color. In one or more embodiments, a bi-color LED 464 may include LEDs 460 and 462. In one example, LED 460 may provide light emissions associated with a blue color. For instance, the blue color may appear blue to a user of IHS 110. In another example, LED 462 may provide light emissions associated with a green color. For instance, the green color may appear green to a user of IHS 110. In one or more embodiments, one or more of LEDs 460 and 462 may be coupled to or included in indicator 198, illustrated in FIG. 1C. For example, indicator 198 may be or include bi-color LED 464. In one or more embodiments, indicators 196 and 198 may be combined into a single indicator. For example, the single indicator may include multiple of LEDs 360, 362, 460, and 462. For instance, the single indicator may be or include a multi-color LED.

In one or more embodiments, EC 190 may provide a signal (e.g., a cessation signal) to circuit 400 via lead 396. For example, EC 190 may assert lead 396 high or low. In one or more embodiments, EC 190 may inhibit and/or override one or more indications of circuitry 400. In one example, if EC 190 asserts lead 396 high, then LED 362 may not be illuminated. For instance, circuitry 400 may illuminate LED 362, and if and/or when EC 190 asserts lead 396 high, circuitry 400 may no longer illuminate LED 362. In a second example, if EC 190 asserts lead 396 high, then LED 462 may not be illuminated. For instance, circuitry 400 may illuminate LED 462, and if and/or when EC 190 asserts lead 396 high, circuitry 400 may no longer illuminate LED 462. In another example, if EC 190 asserts lead 396 high, then LED 464 may not be illuminated. For instance, circuitry 400 may illuminate LED 464, and if and/or when EC 190 asserts lead 396 high, circuitry 400 may no longer illuminate LED 464. In one or more embodiments, EC 190 may be coupled to circuitry 400 via interface 280. For example, one or more of leads 390-396 may be coupled to interface 280 of EC 190.

Figure 5A:
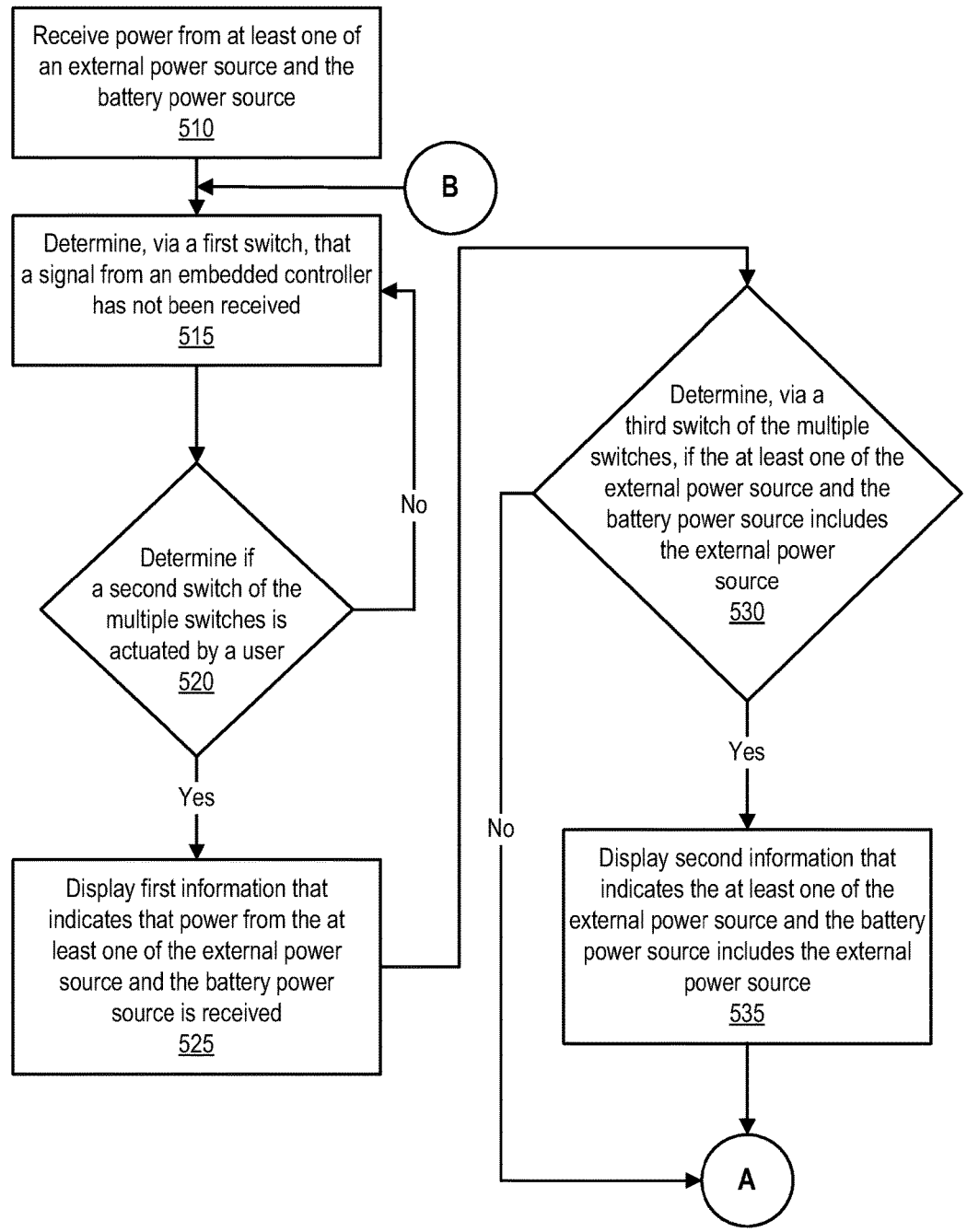
FIGS. 5A and 5B illustrate an example of a method of indicating one or more statuses of an information handling system is illustrated, according to one or more embodiments.
Figure 5B:
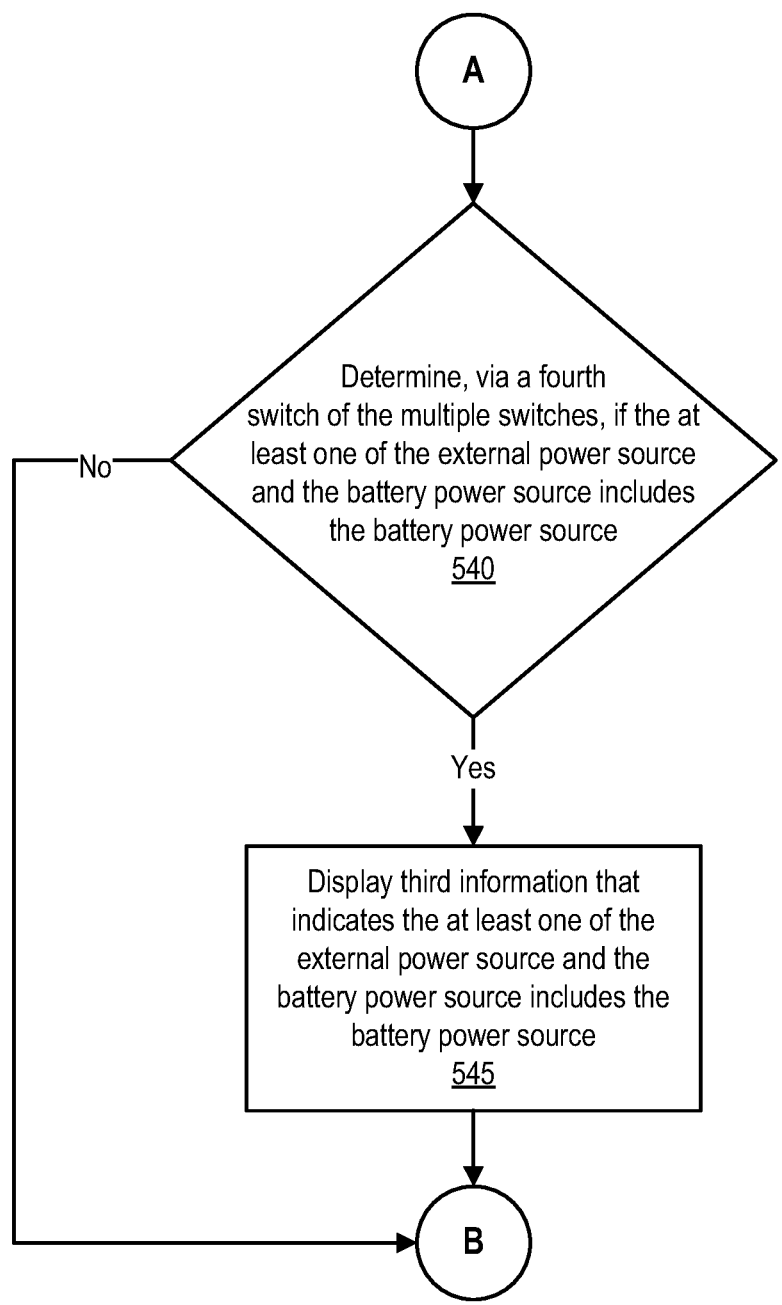

Turning now to FIGS. 5A and 5B, an example of a method of indicating one or more statuses of an information handling system is illustrated, according to one or more embodiments. At 510, power from at least one of an external power source and a battery power source may be received. In one example, circuit 300 may receive power from at least one of an external power source and a battery power source. In another example, circuit 400 may receive power from at least one of an external power source and a battery power source. In one or more embodiments, one or more portions of each of circuits 300 and 400 may be combined, and a combination of the one or more portions of each of circuits 300 and 400 may receive power from at least one of an external power source and a battery power source.

At 515, it may be determined, via a first switch of multiple switches, that a signal from an embedded controller has been not received. For example, the first switch may be or include transistor 342. In one or more embodiments, resistor 318 may pull lead 392 high. For example, pulling lead 392 may provide a reference if the embedded controller is not powered or is not properly functioning. For instance, lead 392 may otherwise float if the embedded controller is not powered or is not properly functioning, and resistor 318 may pull lead 392 high to ensure that lead 392 does not float if the embedded controller is not powered or is not properly functioning. In one or more embodiments, the signal from the embedded controller may pull lead 392 low, which may indicate that the signal from the embedded controller is received. For example, if lead 392 is pulled high, it may be determined that the signal from the embedded controller has not been received.

At 520, it may be determined if a second switch, of the multiple switches, is actuated by a user. For example, the second switch may be or include switch 370. In one or more embodiments, determining if a second switch is actuated by a user may include transistor 346 determining if the second switch is actuated by the user. For instance, switch 370 may pull a base of transistor 346 to ground, which may cause a base of transistor 344 to be no longer grounded. If the second switch is actuated, first information may be displayed, at 525, where the first information may indicate that power from the at least one of the external power source and the battery power source is received. For example, LED 362 may be illuminated. For instance, illuminating LED 362 may indicate that power from the at least one of the external power source and the battery power source is received. If the second switch is not actuated, the method may proceed to 515, according to one or more embodiments.

At 530, it may be determined, via a third switch of the multiple switches, if the at least one of the external power source and the battery power source includes the external power source. In one example, the third switch may include transistor 422. In another example, the third switch may include transistors 346, 344, and 422. For instance, switch 370 may pull a base of transistor 346 to ground, which may cause a base of transistor 344 to be no longer grounded, which may cause a base of transistor 422 to be no longer grounded.

If the at least one of the external power source and the battery power source includes the external power source second information may be displayed, at 535, where the second information may indicate the at least one of the external power source and the battery power source includes the external power source. For example, LED 462 may be illuminated if the at least one of the external power source and the battery power source includes the external power source. For instance, illuminating LED 462 may indicate that the at least one of the external power source and the battery power source includes the external power source. In one or more embodiments, the second information may indicate that one or more of circuitry 400 and IHS 110 is receiving power from external power supply 194. For example, circuitry 400 may indicate, via illuminating LED 462, that IHS 110 is receiving power from external power supply 194 via plug 195. If the at least one of the external power source and the battery power source does not include the external power source second information the method may proceed to 540, according to one or more embodiments.

At 540, it may be determined, via a fourth switch of the multiple switches, if the at least one of the external power source and the battery power source includes the battery power source. In one example, the fourth switch may include transistor 342. In another example, the fourth switch may include transistors 346, 344, and 342. For instance, switch 370 may pull a base of transistor 346 to ground, which may cause a base of transistor 344 to be no longer grounded, which may cause a base of transistor 342 to be no longer grounded. If the at least one of the external power source and the battery power source includes the battery power source, third information may be displayed, at 545, where the third information may indicate that the at least one of the external power source and the battery power source includes the battery power source. For example, LED 362 may be illuminated if the at least one of the external power source and the battery power source includes the battery power source. For instance, if the base of transistor 342 is no longer grounded, LED 362 may be illuminated. In one or more embodiments, illuminating LED 362 may indicate that the at least one of the external power source and the battery power source includes the battery power source, if plug 195 is not coupled to IHS 110. If the at least one of the external power source and the battery power source does not include the battery power source, the method may proceed to 515, according to one or more embodiments.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a battery power source;
   an embedded controller; and
   circuitry coupled to the embedded controller and the battery power source;
   wherein the circuitry includes a plurality of switches and is configured to:
      receive power from at least one of an external power source and the battery power source;
      determine, via a first switch of the plurality of switches, that a signal from the embedded controller has not been received;
      determine if a second switch of the plurality of switches is actuated by a user;
      if the second switch is actuated, display first information that indicates that power from the at least one of the external power source and the battery power source is received and that the signal from the embedded controller of the information handling system has not been received;
      determine, via a third switch of the plurality of switches, if the at least one of the external power source and the battery power source includes the external power source; and
      if the at least one of the external power source and the battery power source includes the external power source, display second information that indicates the at least one of the external power source and the battery power source includes the external power source.

2. The information handling system of claim 1, wherein the circuitry is further configured to:
   determine, via a fourth switch of the plurality of switches, if the at least one of the external power source and the battery power source includes the battery power source; and
   if the at least one of the external power source and the battery power source includes the battery power source, display third information that indicates the at least one of the external power source and the battery power source includes the battery power source.

3. The information handling system of claim 1,
   wherein the first switch includes a first transistor; and
   wherein the third switch includes a second transistor, different from the first transistor.

4. The information handling system of claim 1,
   wherein, to display the first information, the circuitry is further configured to illuminate a first light emitting diode that emits light of a first color; and
   wherein, to display the second information, the circuitry is further configured to illuminate a second light emitting diode that emits light of a second color, different from the first color.

5. The information handling system of claim 4, wherein a multi-color light emitting diode includes at least one of the first light emitting diode and the second light emitting diode.

6. The information handling system of claim 1, wherein the embedded controller is configured to:
cease the first information from being displayed; and
cease the second information from being displayed.

7. The information handling system of claim 6,
wherein, to cease the first information from being displayed, the embedded controller is further configured to actuate a fourth switch of the plurality of switches; and
wherein the circuitry is further configured to determine, via the fourth switch, that displaying the first information is to be ceased.

8. A method, comprising:
circuitry, that includes a plurality of switches, receiving power from at least one of an external power source and a battery power source;
the circuitry determining, via a first switch of the plurality of switches, that a signal from an embedded controller of an information handling system has not been received;
the circuitry determining if a second switch of the plurality of switches is actuated by a user;
if the second switch is actuated, the circuitry displaying first information that indicates that power from the at least one of the external power source and the battery power source is received and that the signal from the embedded controller of the information handling system has not been received;
the circuitry determining, via a third switch of the plurality of switches, if the at least one of the external power source and the battery power source includes the external power source; and
if the at least one of the external power source and the battery power source includes the external power source, the circuitry displaying second information that indicates the at least one of the external power source and the battery power source includes the external power source.

9. The method of claim 8, further comprising:
the circuitry determining, via a fourth switch of the plurality of switches, if the at least one of the external power source and the battery power source includes the external power source; and
if the at least one of the external power source and the battery power source includes the battery power source, the circuitry displaying third information that indicates the at least one of the external power source and the battery includes the battery power source.

10. The method of claim 8,
wherein the first switch includes a first transistor; and
wherein the third switch includes a second transistor.

11. The method of claim 8,
wherein the circuitry displaying the first information includes illuminating a first light emitting diode that emits light of a first color; and
wherein the circuitry displaying the second information includes illuminating a second light emitting diode that emits light of a second color, different from the first color.

12. The method of claim 11, wherein a multi-color light emitting diode includes at least one of the first light emitting diode and the second light emitting diode.

13. The method of claim 8, further comprising:
the embedded controller ceasing the displaying the first information.

14. The method of claim 13,
wherein the embedded controller ceasing the displaying the first information includes providing a signal to a fourth switch of the plurality of switches;
the method further comprising:
the circuitry determining, via the fourth switch, that the displaying the first information is to be ceased.

15. Circuitry of an information handling system, comprising:
a plurality of switches;
wherein the circuit is configured to:
receive power from at least one of an external power source and a battery power source;
determine, via a first switch of the plurality of switches, that a signal from an embedded controller, of the information handling system, has not been received;
determine if a second switch of the plurality of switches is actuated by a user;
if the second switch is actuated, display first information that indicates that power from the at least one of the external power source and the battery power source is received and that the signal from the embedded controller of the information handling system has not been received;
determine, via a third switch of the plurality of switches, if the at least one of the external power source and the battery power source includes the external power source; and
if the at least one of the external power source and the battery power source includes the external power source display second information that indicates the at least one of the external power source and the battery power source includes the external power source.

16. The circuitry of claim 15, wherein the circuitry is further configured to:
determine, via a fourth switch of the plurality of switches, if the at least one of the external power source and the battery power source includes the battery power source; and
if the at least one of the external power source and the battery power source includes the battery power source, display third information that indicates the at least one of the external power source and the battery power source includes the battery power source.

17. The circuitry of claim 15,
wherein the first switch includes a first transistor; and
wherein the third switch includes a second transistor, different from the first transistor.

18. The circuitry of claim 15,
wherein, to display the first information, the circuitry is further configured to illuminate a first light emitting diode that emits light of a first color; and
wherein, to the display the second information, the circuitry is further configured to illuminate a second light emitting diode that emits light of a second color, different from the first color.

19. The circuitry of claim 18, wherein a multi-color light emitting diode includes at least one of the first light emitting diode and the second light emitting diode.

20. The circuitry of claim 15, wherein circuitry is further configured to: receive a cessation signal from the embedded controller; and cease the first information from being displayed based at least on the cessation signal from the embedded controller.

* * * * *